(12) United States Patent
Liyanage et al.

(10) Patent No.: US 9,382,399 B2
(45) Date of Patent: Jul. 5, 2016

(54) FOAM COMPOSITION AND ITS USES THEREOF

(75) Inventors: Gaya Keerthi Liyanage, Nittambuwa (LK); Ranil Kirthi Vitarana, Colombo (LK)

(73) Assignee: MAS INNOVATION (PRIVATE) LIMITED, Colombo (LK)

( * ) Notice: Subject to any disclaimer, the term of this patent is extended or adjusted under 35 U.S.C. 154(b) by 175 days.

(21) Appl. No.: 14/115,634

(22) PCT Filed: May 11, 2012

(86) PCT No.: PCT/GB2012/051034
§ 371 (c)(1),
(2), (4) Date: Nov. 5, 2013

(87) PCT Pub. No.: WO2012/156690
PCT Pub. Date: Nov. 22, 2012

(65) Prior Publication Data
US 2014/0079940 A1    Mar. 20, 2014

(30) Foreign Application Priority Data

May 13, 2011 (GB) ............................... GB1108044.7
May 13, 2011 (GB) ............................... GB1108046.2

(51) Int. Cl.
| | |
|---|---|
| *C08J 9/14* | (2006.01) |
| *B29C 44/12* | (2006.01) |
| *B32B 5/24* | (2006.01) |
| *C08G 18/18* | (2006.01) |
| *C08G 18/16* | (2006.01) |
| *C08G 101/00* | (2006.01) |

(52) U.S. Cl.
CPC ................. *C08J 9/149* (2013.01); *B29C 44/12* (2013.01); *B29C 44/1261* (2013.01); *B32B 5/245* (2013.01); *C08G 18/18* (2013.01); *B32B 2266/0278* (2013.01); *C08G 18/16* (2013.01); *C08G 18/161* (2013.01); *C08G 2101/00* (2013.01); *Y10T 428/249953* (2015.04)

(58) Field of Classification Search
CPC ........ C08G 18/16; C08G 18/18; C08G 18/161
See application file for complete search history.

(56) References Cited

U.S. PATENT DOCUMENTS

| | | | |
|---|---|---|---|
| 3,862,150 A | 1/1975 | Bechara et al. | |
| 4,738,809 A | 4/1988 | Storch | |
| 4,791,146 A * | 12/1988 | Tylenda | ......................... 521/114 |
| 5,124,368 A | 6/1992 | Gill et al. | |
| 5,770,635 A | 6/1998 | Lee et al. | |
| 6,818,675 B2 | 11/2004 | El Ghobary et al. | |
| 2004/0176495 A1 | 9/2004 | You et al. | |
| 2013/0331473 A1* | 12/2013 | Motta et al. | ................... 521/160 |

FOREIGN PATENT DOCUMENTS

| | | |
|---|---|---|
| EP | 0656383 A1 | 6/1995 |
| EP | 1 018 526 A1 | 7/2000 |
| EP | 1018525 A1 | 7/2000 |
| FR | 2 470 566 | 6/1981 |
| JP | S6244412 A | 2/1987 |
| JP | H01168717 A | 7/1989 |
| JP | H02127015 A | 5/1990 |
| JP | H05192942 A | 8/1993 |
| JP | H0687941 A | 3/1994 |
| JP | H07233234 A | 9/1995 |
| JP | 2000204134 A | 7/2000 |
| JP | 2003170442 A | 6/2003 |

OTHER PUBLICATIONS

International Search Report and Written Opinion of the ISA, Dec. 4, 2012, 13 pages.
International Preliminary Report on Patentability, Aug. 23, 2013, 14 pages.

* cited by examiner

*Primary Examiner* — Melissa Rioja
(74) *Attorney, Agent, or Firm* — Michael W. Ferrell; Ferrells, PLLC; Anna L. Kinney

(57) ABSTRACT

The present invention provides a foam composition comprising a polyol, an isocyanate, a first catalyst capable of accelerating a reaction between the polyol and the isocyanate and a second catalyst capable of initiating a reaction between the polyol and the isocyanate at a rate slower than the first catalyst. There is also provided a method for preparing the foam composition.

22 Claims, 4 Drawing Sheets

FOAM COMPOSITION AND ITS USES THEREOF

FIELD OF THE INVENTION

The present invention relates to a foam composition, a method of preparing the same, and its uses thereof. In particular, the foam composition may be for use in fabric laminated foam articles.

BACKGROUND OF THE INVENTION

An inherent fault of injecting a polyurethane foam mixture onto a fabric substrate is the penetration of the polyurethane mixture into the fabric due to the high pressure flow of the foam mixture from the mix head during early stages of gelation, and during diffusion of the raw material into the yarn interface by lipophilic or lipophobic properties of the polyurethane material and the yarn. As a result the area of fabric in the impact zone of the polyurethane mix head nozzle is the most susceptible to penetration.

It is common to use a composite layer between the fabric and foam substrates to prevent penetration of the raw materials of the foam composition through the fabric. The composite layer serves the purpose of enhancing the bonding between the mentioned substrates to give good wear resistance properties to the foam and fabric composite while acting as a physical barrier preventing penetration of the raw materials of the foam composition into the fabric. However, a drawback of using such a composite within the substrates is the impaired breathability as a result. For example, this may be the case for automotive seats which will cause an accumulation of heat and moisture between the passenger and the seat, making it very uncomfortable and may even cause damage to the seat over a period of time.

An existing technology in which a composite layer is not used includes the pour-in-place (PIP) technology as described in EP 0210587 and EP 1901828. In the PIP technology which is a non-barrier method, a thin film of PU foam of varying density is used depending on the required breathability and penetration of the product manufactured. The higher the compressed density ratios of PU film the lower the breathability and penetration.

In another method such as that described in U.S. Pat. No. 5,124,368, a temporary barrier is utilised to retard penetration while improving breathability properties. A thermoplastic substrate is introduced as a temporary barrier onto the fabric prior to the foam composition being introduced onto the fabric. Once the foam composition has been exposed to the fabric and curing has taken place, the product is then exposed to high temperatures where the thermoplastic barrier melts. This method, however, does not deliver on expected breathability values and therefore is limited to applications where breathability is not a vital factor. Further, in the case of thinner fabrics, the thermoplastic, once melted, migrates through the fabric and alters the hand feel of the fabric.

Another method is to use an elevated reactive system by employing catalyst to reduce the duration of cream/gel time and cause an exponential rise in the viscosity within that cream time. An example of this method is described in FR 2470566. The inherent rise in viscosity will therefore reduce impact penetration as the foam composition will not be able to pass through the space within the yarns in the fabric. Using such a system to prevent penetration may also reduce reaction times and accelerate curing times, reducing overall cycle times. However, due to this same property of reduced reaction time and accelerated curing time, this system cannot be used to manufacture large articles as creaming and gelling would conclude before the full dosage of the foam composition can be poured and set into the mould. This would leave the product with a ring of layers from the point of pouring outwards with varying density, resilience and uneven curing. A further consequence of using such a method is that elevated levels of catalyst will remain within the finished product. This will cause quality failures due to fogging and staining of the fabric as well as be a health issue if it was to come into contact with the skin.

There is therefore a need for an improved foam composition and method for the manufacturing of a fabric laminated foam article.

SUMMARY OF THE INVENTION

The present invention seeks to address these problems, and provides an improved foam composition. In particular, the foam composition according to the present invention may be suitable for use in fabric laminated foam articles. There is also provided an improved method of manufacturing a fabric laminated foam article.

According to a first aspect, there is provided a method for preparing a foam composition comprising the steps of:
    adding at least one polyol;
    adding at least one isocyanate; and
    adding a catalyst,
wherein the catalyst comprises a first catalyst and a second catalyst, the first catalyst being capable of accelerating a reaction between the at least one polyol and the at least one isocyanate, and the second catalyst being capable of initiating a reaction between the at least one polyol and the at least one isocyanate slower than the first catalyst.

For the purposes of the present invention, the first catalyst may be referred to as a normal catalyst and the second catalyst may be referred to as a delayed action catalyst.

Any suitable normal catalyst and delayed action catalyst may be used for the purposes of the present invention. In particular, the delayed action catalyst may be an organic delayed action catalyst.

The at least one normal catalyst may comprise a normal gelling catalyst and a normal blowing catalyst. Any suitable normal gelling catalyst and normal blowing catalyst may be used for the purposes of the present invention. For example, the normal gelling catalyst may include, but is not limited to, 1,4-diazabicyclo[2.2.2]octane, N-(3-dimethylaminopropyl)-N,N-diisopropanolamine, dibutyl tin dilaurate and stannous octoate. For example, the normal blowing catalyst may include, but is not limited to, bis(2-dimethylaminoethyl) ether, N,N-dimethylethanolamine and N,N,N'-trimethyl-N'-hydroxyethyl-bisaminoethylether.

A suitable amount of the normal gelling catalyst and the normal blowing catalyst may be added. In particular, the ratio of the normal gelling catalyst to the normal blowing catalyst may be in the range of about 2:1 to 25:1, 2.5:1 to 23:1, 3:1 to 20:1, 4:1 to 18:1, 5:1 to 15:1, 8:1 to 12:1, 9:1 to 10:1. Even more in particular, the ratio of the normal gelling catalyst to the normal blowing catalyst may be in the range of about 3:1 to 20:1.

The at least one delayed action catalyst may comprise a delayed action gelling catalyst and a delayed action blowing catalyst. Any suitable delayed action gelling catalyst and delayed action blowing catalyst may be used for the purposes of the present invention. For example, the delayed action gelling catalyst may include, but is not limited to, any of the normal gelling catalysts listed above in which the amino group is reacted with a suitable acid. In particular, the amino group is reacted with an organic acid. The acid may be 2-hydroxypropionic acid, formic acid, lactic acid or any other suitable acid known to a skilled person. For example, the delayed action blowing catalyst may include, but is not limited to, any of the normal blowing catalysts listed above in which the amino group is reacted with a suitable acid. In particular, the amino group is reacted with an organic acid. The acid may be 2-hydroxypropionic acid, formic acid, lactic acid or any other suitable acid known to a skilled person.

A suitable amount of the delayed action gelling catalyst and the delayed action blowing catalyst may be added. In particular, the ratio of the delayed action gelling catalyst to the delayed action blowing catalyst may be in the range of about 0.2:1 to 5:1, 0.5:1 to 3:1, 0.8:1 to 2.5:1, 0.9:1 to 2.2:1, 1:1 to 2:1, 1.5:1 to 1.8:1. Even more in particular, the ratio of the delayed action gelling catalyst to the delayed action blowing catalyst may be in the range of about 1:1 to 4:1.

According to a particular aspect, the amounts of normal gelling catalyst and the delayed action gelling catalyst may be balanced. In particular, the ratio of the normal gelling catalyst to the delayed action gelling catalyst may be 0.1:1 to 15:1, 0.8:1 to 12:1, 1:1 to 10:1, 2:1 to 8:1, 5:1 to 6:1. Even more in particular, the ratio of the normal gelling catalyst to the delayed action gelling catalyst may be in the range of about 0.5:1 to 10:1.

According to a particular aspect, the amounts of normal blowing catalyst and the delayed action blowing catalyst may be balanced. In particular, the ratio of the normal blowing catalyst to the delayed action blowing catalyst may be 0.5:1 to 15:1, 0.8:1 to 12:1, 1:1 to 10:1, 2:1 to 8:1, 5:1 to 6:1. Even more in particular, the ratio of the normal blowing catalyst to the delayed action blowing catalyst may be in the range of about 1:1 to 10:1.

Any suitable polyol may be used for the purposes of the present invention. For example, the polyol may be a polyether or a polyester. According to a particular aspect, the polyol may have a molecular weight in the range 300-7000 Da, 500-6500 Da, 1000-6000 Da, 2000-5500 Da, 3500-5000 Da, 4000-4500 Da. According to another particular aspect, the at least one polyol may comprise a di-functional polyol, a tri-functional polyol, a tetra-functional polyol or a combination thereof. The at least one polyol may comprise a primary hydroxyl group terminated polyol. In particular, the at least one polyol may comprise an ethylene oxide terminated polyol.

Any suitable isocyanate may be used for the purposes of the present invention. According to a particular aspect, the at least one isocyanate may comprise an isocyanate content of about 2.4-49%. In particular, the isocyanate content may be 5-45%, 10-40%, 17-38%, 20-30%, 25-35%. Even more in particular, the isocyanate content may be about 28-32%. According to another particular aspect, the at least one isocyanate may comprise an aromatic, aliphatic, pre-polymer isocyanate, or a combination thereof. Examples of suitable isocyanates include, but are not limited to, toluene diisocyanate, diphenylmethane diisocyanate, or a combination thereof.

The at least one isocyanate may be added in any suitable amount. In particular, the amount of isocyanate added may be in an amount of about 20-100, 30-90, 35-85, 40-80, 50-70, 55-65 parts per hundred parts (pphp) of polyol. Even more in particular, the amount of isocyanate added may be in an amount of about 30-55 pphp of polyol.

The method may further comprise the step of adding at least one surfactant. Any suitable surfactant may be used for the purposes of the present invention. For example, the surfactant may be a silicon-based surfactant. In particular, the surfactant may comprise a molecular weight of about 5000-30000 Da.

The method may further comprise the step of adding at least one blowing agent. Any suitable blowing agent may be used for the purposes of the present invention. For example, the blowing agent may be water, hydrocarbon, halogenated hydrocarbon, or a combination thereof. In particular, the blowing agent may be water.

The at least one blowing agent may be added in any suitable amount. In particular, the amount of blowing agent added may be in an amount of about 1-15, 2-10, 3-8, 6-7 parts per hundred parts (pphp) of polyol.

The method may further comprise the step of curing the composition for a pre-determined period of time to form a foam article. In particular, the pre-determined period of time may be ≥30 seconds. Even more in particular, the pre-determined period of time may be between 60-90 seconds.

According to a second aspect, the present invention provides a foam composition prepared by the method described above. In particular, the foam composition prepared from the method may be suitable for use in fabric laminated foam articles.

According to a third aspect, there is provided a foam composition comprising:
at least one polyol;
at least one isocyanate; and
a catalyst,
wherein the catalyst comprises a first catalyst and a second catalyst, the first catalyst being capable of accelerating a reaction between the at least one polyol and the at least one isocyanate, and the second catalyst being capable of initiating a reaction between the at least one polyol and the at least one isocyanate at a rate slower than the first catalyst.

As mentioned above, the first catalyst may be referred to as a normal catalyst and the second catalyst may be referred to as a delayed action catalyst.

The foam composition may be for use in any suitable application. For example, the foam composition may be for use in fabric laminated foam articles.

Any suitable polyol, isocyanate, normal catalyst and delayed action catalyst may be used for the purposes of the present invention. For example, the polyol, isocyanate, normal catalyst and delayed action catalyst may be as described above.

According to a particular aspect, the amounts of normal gelling catalyst and the delayed action gelling catalyst may be balanced. In particular, the ratio of the normal gelling catalyst to the delayed action gelling catalyst present in the foam composition may be 0.1:1 to 15:1, 0.8:1 to 12:1, 1:1 to 10:1, 2:1 to 8:1, 5:1 to 6:1. Even more in particular, the ratio of the normal gelling catalyst to the delayed action gelling catalyst may be in the range of about 0.5:1 to 10:1.

According to a particular aspect, the amounts of normal blowing catalyst and the delayed action blowing catalyst may be balanced. In particular, the ratio of the normal blowing catalyst to the delayed action blowing catalyst present in the foam composition may be 0.5:1 to 15:1, 0.8:1 to 12:1, 1:1 to 10:1, 2:1 to 8:1, 5:1 to 6:1. Even more in particular, the ratio of the normal blowing catalyst to the delayed action blowing catalyst may be in the range of about 1:1 to 10:1.

The foam composition may comprise at least one surfactant. Any suitable surfactant may be used for the purposes of the present invention. For example, the surfactant may be as described above.

The foam composition may comprise at least one blowing agent. Any suitable blowing agent may be used for the purposes of the present invention. For example, the blowing agent may be as described above.

According to a fourth aspect of the present invention, there is provided a method for the manufacture of a fabric laminated foam article comprising the steps of:
 contacting a fabric with a first mould;
 providing the foam composition according to any aspect of the present invention to a second mould;
 bringing the first mould and the second mould towards and into each other at a pre-determined rate of impact to enable the fabric to contact the foam composition;
 curing the foam composition for a pre-determined period of time to form a foam article; and
 removing the foam article.

The pre-determined rate of impact may be any suitable rate of impact. According to a particular aspect, the pre-determined rate of impact may be about ≤3 mm/second. In particular, the pre-determined rate of impact may be about 0.1-1, 0.5-0.8, 0.6-0.75, mm/second.

The pre-determined period of time may be any suitable amount of time. According to a particular aspect, the pre-determined period of time may be ≥30 seconds. In particular, the pre-determined period of time may be about 45 seconds-2 hours, 60 seconds-1 hour, 90 seconds-45 minutes, 5 minutes-30 minutes, 10 minutes-20 minutes, 15 minutes-18 minutes. Even more in particular, the pre-determined period of time may be about 60-90 seconds.

According to a particular aspect, the method may further comprise a step of trimming the foam article after the removing step.

According to a fifth aspect, there is provided an article of manufacture comprising the fabric laminated foam article manufactured by the method according to the fourth aspect of the present invention. The article of manufacture may be any suitable article of manufacture. For example, the article of manufacture may comprise, but is not limited to, a car seat, a head rest, furniture, a diving suit or protective clothing. The article of manufacture may also comprise a breast covering garment. In particular, the breast covering garment may be a bra, particularly a bra cup.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings.

DETAILED DESCRIPTION OF THE INVENTION

Figure 1:
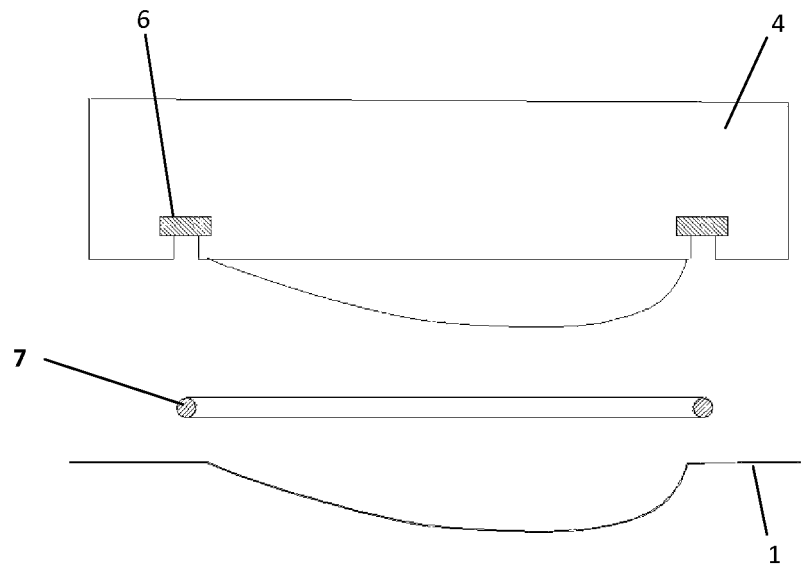
FIG. 1: A sectional side orthographic view of a male mould.
Figure 2:
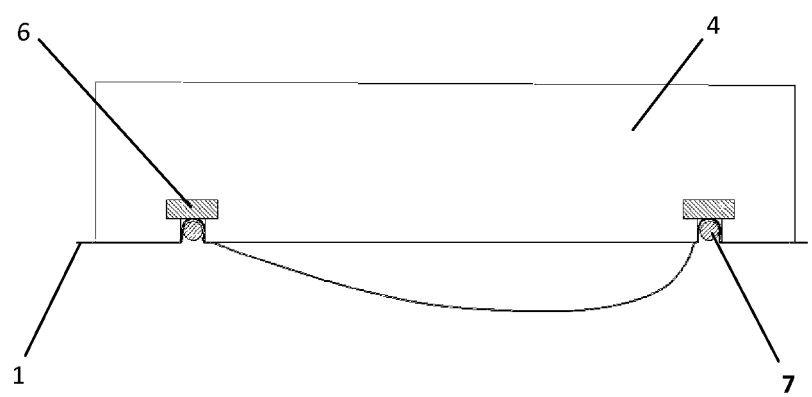
FIG. 2: A sectional side orthographic view of a male mould lined with a fabric liner.
Figure 3:
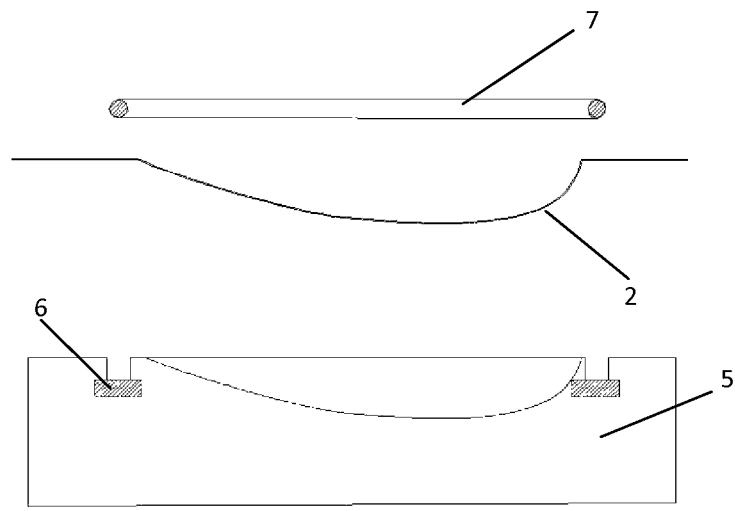
FIG. 3: A sectional side orthographic view of a female mould.
Figure 4:
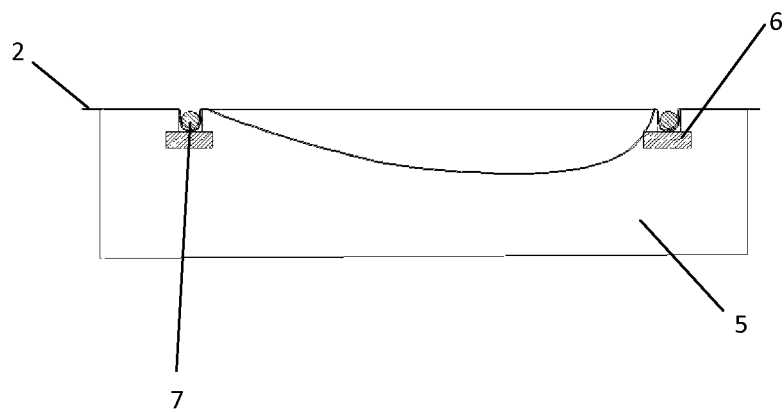
FIG. 4: A sectional side orthographic view of a female mould lined with a fabric liner.
Figure 5:
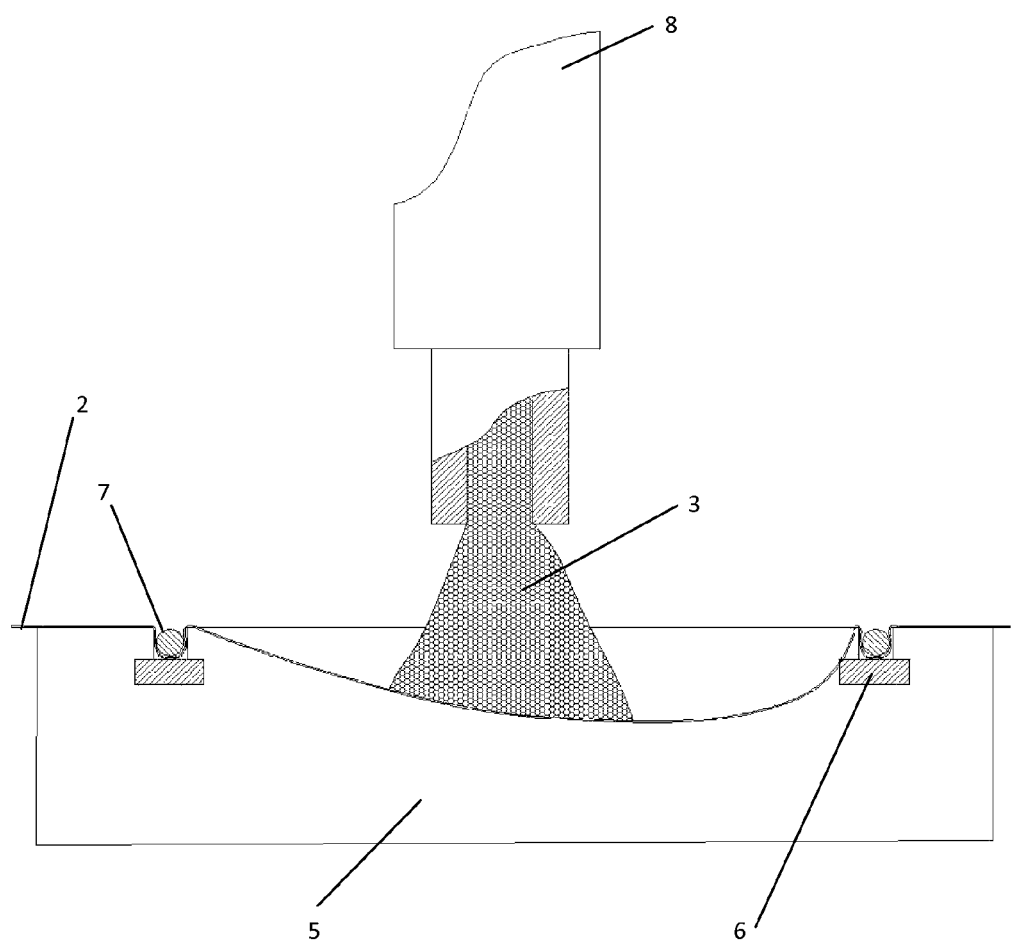
FIG. 5: A sectional side orthographic view showing the foam composition being poured into the female mould.

The foam composition of the present invention seeks to provide an improved foam composition in which the foam composition promotes gelling and foaming reaction, while at the same time preventing premature curing. Accordingly, the foam composition of the present invention provides a balanced rate of kinetics between the gelling and curing reactions.

According to a first aspect, there is provided a method for preparing a foam composition comprising the steps of:
 adding at least one polyol;
 adding at least one isocyanate; and
 adding a catalyst,
wherein the catalyst comprises a first catalyst and a second catalyst, the first catalyst being capable of accelerating a reaction between the at least one polyol and the at least one isocyanate, and the second catalyst being capable of initiating a reaction between the at least one polyol and the at least one isocyanate slower than the first catalyst.

For the purposes of the present invention, the first catalyst may be referred to as a normal catalyst and the second catalyst may be referred to as a delayed action catalyst.

The foam composition prepared from the method of the present invention may be for use in any suitable application. For example, the foam composition may be for use in fabric laminated foam articles. The foam may be any suitable foam. For example, the foam may be polyurethane foam.

A normal catalyst may be defined as a catalyst which accelerates the reaction between isocyanates and polyols in the formation of foams. A normal catalyst may also accelerate the reaction between isocyanates and water in the formation of foams. Normal catalysts contribute towards the gelling and/or blowing reactions in the formation of foams. According to a particular aspect, the normal catalyst may be an amine catalyst. In particular, the normal catalyst may be a tertiary amine catalyst.

The at least one normal catalyst may comprise a normal gelling catalyst and a normal blowing catalyst. A normal gelling catalyst may be defined as a catalyst which predominantly catalyses the process of gelation in the formation of foam. The foam may be polyurethane or its derivatives. A normal blowing catalyst may be defined as a catalyst which predominantly catalyses the reaction between isocyanate and water to yield carbamic acid, the decomposition of which results in the generation of carbon dioxide, which contributes to the generation of foam cells in foam formation. The foam may be polyurethane or its derivatives.

Any suitable normal gelling catalyst and normal blowing catalyst may be used for the purposes of the present invention. For example, the normal gelling catalyst may include, but is not limited to, 1,4-diazabicyclo[2.2.2]octane, N-(3-dimethylaminopropyl)-N,N-diisopropanolamine, dibutyl tin dilaurate and stannous octoate. For example, the normal blowing catalyst may include, but is not limited to, bis(2-dimethylaminoethyl)ether, N,N-dimethylethanolamine and N,N,N'-trimethyl-N'-hydroxyethyl-bisaminoethylether.

A suitable amount of the normal gelling catalyst and the normal blowing catalyst may be added. In particular, the ratio of the normal gelling catalyst to the normal blowing catalyst may be in the range of about 2:1 to 25:1, 2.5:1 to 23:1, 3:1 to 20:1, 4:1 to 18:1, 5:1 to 15:1, 8:1 to 12:1, 9:1 to 10:1. Even more in particular, the ratio of the normal gelling catalyst to the normal blowing catalyst may be in the range of about 3:1 to 20:1. The ratios referred to in the present invention are weight ratios.

A delayed action catalyst may be defined as a catalyst in which the catalytic activity is initiated after a period of time. Delayed action catalysts may not be very active at room temperature but may become effective when the initial reaction exotherm warms up the foaming mass. The catalytic activity may be initiated by the onset of heat either by unmasking a blocking agent of the catalyst or by heat activation. In particular, the delayed catalyst may start to function once the temperature of the reaction mixture reaches about 50° C., and when the acid group comprised in the catalyst separates from the rest of the structure of the catalyst.

According to a particular aspect, the delayed action catalyst may be an organic delayed action catalyst. Delayed action catalysts may comprise a masked amine catalyst. In particular, the delayed action catalyst may comprise a masked tertiary amine catalyst. For example, the tertiary amine catalyst may be masked by an acid. Any suitable acid may be used to mask a tertiary amine catalyst to form a delayed action catalyst. Examples of suitable acids include, but are not limited to, formic acid, lactic acid, two hydroxyl butanoic acid, maleic acid, fumaric acid. In particular, the tertiary amine catalyst may be masked by equimolar concentrations of two hydroxyl propionic acid.

For example, the catalytic activity of a delayed action catalyst may be initiated at about 40-60° C. In particular, the temperature may be about 50° C. At the suitable temperature, the hydroxyl group of the resultant acid is reacted with the isocyanate in the foam composition.

The at least one delayed action catalyst may comprise a delayed action gelling catalyst and a delayed action blowing catalyst. The delayed action gelling catalyst may be any suitable catalyst which delays the gelling reaction. The delayed action blowing catalyst may be any suitable catalyst which delays the blowing reaction.

Any suitable delayed action gelling catalyst and delayed action blowing catalyst may be used for the purposes of the present invention. For example, the delayed action gelling catalyst may include, but is not limited to, any of the normal gelling catalysts listed above in which the amino group is reacted with a suitable acid. In particular, the amino group is reacted with an organic acid. The acid may be 2-hydroxypropionic acid, formic acid, lactic acid or any other suitable acid known to a skilled person. Even more in particular, the delayed action gelling catalyst may be 1,4-diazabicyclo [2.2.2]octane blocked with two hydroxyl propionic acid. For example, the delayed action blowing catalyst may include, but is not limited to, any of the normal blowing catalysts listed above in which the amino group is reacted with a suitable acid. In particular, the amino group is reacted with an organic acid. The acid may be 2-hydroxypropionic acid, formic acid, lactic acid or any other suitable acid known to a skilled person. Even more in particular, the delayed action blowing catalyst may be bis(dimethyl amino ethyl)ether blocked with 2-hydroxypropionic acid.

A suitable amount of the delayed action gelling catalyst and the delayed action blowing catalyst may be added. In particular, the ratio of the delayed action gelling catalyst to the delayed action blowing catalyst may be in the range of about 0.2:1 to 5:1, 0.5:1 to 3:1, 0.8:1 to 2.5:1, 0.9:1 to 2.2:1, 1:1 to 2:1, 1.5:1 to 1.8:1. Even more in particular, the ratio of the delayed action gelling catalyst to the delayed action blowing catalyst may be in the range of about 1:1 to 4:1.

The amounts of normal gelling catalyst and the delayed action gelling catalyst added to prepare the foam composition may be balanced. By adding suitable amounts of normal gelling catalyst and delayed action gelling catalyst in the preparation of the foam composition, a suitable rate of gelling reaction is achieved when the foam composition is subsequently subjected to a curing step without the gelling reaction proceeding too fast. If the gelling reaction is too fast, the density of the resultant foam may be higher due to the impaired blowing reaction. Consequently, the resultant foam may have decompression voids packed with air bubbles and impaired viscoelastic properties.

According to a particular aspect, the ratio of the normal gelling catalyst to the delayed action gelling catalyst may be 0.1:1 to 15:1, 0.8:1 to 12:1, 1:1 to 10:1, 2:1 to 8:1, 5:1 to 6:1. In particular, the ratio of the normal gelling catalyst to the delayed action gelling catalyst may be in the range of about 0.5:1 to 10:1.

The amounts of normal blowing catalyst and the delayed action blowing catalyst added to prepare the foam composition may be balanced. By adding suitable amounts of normal blowing catalyst and delayed action blowing catalyst in the preparation of the foam composition, a suitable rate of blowing or foaming reaction is achieved when the foam composition is subsequently subjected to a curing step without the foaming reaction proceeding too fast. If the blowing reaction is too fast, the fast generation of carbon dioxide and concomitant diffusion of the carbon dioxide to the nuclei may result in the formation of cells in a medium which is polymerised to a lesser extent to withstand expanding gas pressure. The resultant foam may collapse or may result in the coalescence of cells leading to blisters and unequal pore size. This may lead to the formation of hard spots on the resultant foam in addition to the blisters because of the accumulation of high density polymeric areas around the blisters.

According to a particular aspect, the ratio of the normal blowing catalyst to the delayed action blowing catalyst may be 0.5:1 to 15:1, 0.8:1 to 12:1, 1:1 to 10:1, 2:1 to 8:1, 5:1 to 6:1. Even more in particular, the ratio of the normal blowing catalyst to the delayed action blowing catalyst may be in the range of about 1:1 to 10:1.

Any suitable polyol may be used for the purposes of the present invention. The polyol, or blends thereof, employed for the purposes of the present invention, depends on the end use of the foam to be produced. The specific foam application may influence the choice of the polyol. The molecular weight or hydroxyl number of the polyol may be selected so as to result in a particular type of foam when the polyol is converted to the foam.

In particular, the selection of molecular weight and hydroxyl number of a polyol may be based on the resultant activity and other elasticity properties of the resultant foam. For example, in the case of a rigid or semi-rigid foam product, it is possible to use smaller molecular weights and higher hydroxyl number polyols known in the art.

For example, suitable polyols may be selected for making polyurethane. Polyols which are useful for making polyurethane, particularly via the one-shot foaming process, are any of the types presently employed in the art for the preparation of flexible slabstock foams, flexible molded foams, semi-flexible foams, and rigid foams.

According to a particular aspect, the polyol may have a molecular weight in the range 300-7000 Da, 500-6500 Da, 1000-6000 Da, 2000-5500 Da, 3500-5000 Da, 4000-4500 Da. For example, if the foam to be prepared from the foam composition is a flexible foam, the molecular weight of the polyol added to the foam composition may be in the range of about 3500-7000 Da. In particular, the molecular weight of the polyol added to the foam composition may be in the range of about 4500-6000 Da. For example, if the foam to be prepared from the foam composition is a semi-flexible foam, the molecular weight of the polyol added to the foam composition may be in the range of about 1000-2500 Da. In particular, the molecular weight of the polyol added to the foam composition may be in the range of about 1500-2000 Da. For example, if the foam to be prepared from the foam composition is a rigid foam, the molecular weight of the polyol added to the foam composition may be in the range of about 250-900 Da. In particular, the molecular weight of the polyol added to the foam composition may be in the range of about 350-500 Da.

The polyol may have a hydroxyl number in the range of about 15-700, 20-750, 30-650, 45-500, 50-450, 70-300, 75-350, 85-250, 100-175. In particular, if the foam to be prepared from the foam composition is a flexible foam, the hydroxyl number of the polyol is about 20-70. The hydroxyl number is defined as the number of milligrams of potassium hydroxide required for the complete hydrolysis of the fully phthalated or acetylated derivative prepared from one gram of polyol. If the foam to be prepared from the foam composition is a semi-flexible foam, the hydroxyl number of the polyol is about 100-300. If the foam to be prepared from the foam composition is a rigid foam, the hydroxyl number of the polyol is about 250-900.

According to another particular aspect, the at least one polyol may comprise a di-functional polyol, a tri-functional polyol, a tetra-functional polyol or a combination thereof. For example, for flexible foams, the preferred functionality, i.e., the average number of hydroxyl groups per molecule of polyols is about 2 to about 4 and more particularly about 2.3 to about 3.5. For rigid foams the preferred functionality is about 2 to about 8 and more particularly about 3 to about 5. The polyol may comprise diols, triols, tetraols and higher functionality polyols which are end-capped with ethylene oxide as dictated by the reactivity requirements under cold cure conditions. The ethylene oxide, when used, may be incorporated in any fashion along the polymer chain. In particular, the ethylene oxide may be incorporated either in internal blocks, as terminal blocks, or may be randomly distributed along the polyol chain. In total, the ethylene oxide content may be from 8-30% of the total polymer. For example, the polyol may be a polyether polyol or a polyester polyol. In particular, the polyols may be poly(oxypropylene)polyols.

The at least one polyol may comprise a primary hydroxyl group terminated polyol. In particular, primary hydroxyl group terminated polyols may be used to achieve a higher level of activity. In particular, the at least one polyol may comprise an ethylene oxide terminated polyol. A skilled person would understand that primary hydroxyl group terminated polyols are about five times more reactive than secondary hydroxyl group terminated polypropylene polyols. The molecular weight of the polyol also determines the softness of the resultant foam. The polyol may be characterized by having at least 75% primary hydroxyl groups as measured by ASTM D-4273. In particular, the polyol may have at least 85% primary hydroxyl groups as measured by ASTM D-4273. According to a particular aspect, the polyol may have 20-30% terminally ethylene hydroxyl group and 70% pendant polypropylene groups having hydroxyl number of about 20-40. In particular, the polyol may have a hydroxyl number of about 22-29. Examples of polyols suitable for the purposes of the present invention include, but are not limited to, Lupranol 2046 (BASF) and Voranol 4701 (Dow Chemicals).

The at least one polyol according to the present invention may also include a copolymer polyol. The use of a copolymer polyol may provide the resultant foam with resilience and load bearing capacities. The copolymer polyol may be any suitable polyol. For example, the copolymer polyol may be a polyol comprising styrene acrylonitrile content of about 20-45%, particularly 30-40%, with hydroxyl number of about 25-30 and a molecular weight range from about 3500-6000 Da, particularly in the range 3800-4000 Da. The copolymer polyol may include, but is not limited to, Lupranol 4800 (BASF) and Voranol 3943A (Dow Chemicals).

The at least one polyol may also comprise a modifier polyol with terminal primary hydroxyl groups as described above. The polyol may have a higher molecular weight ranging from about 6000-10000 Da, in particular about 7000 Da with a hydroxyl number of about 20-25. An example of such a polyol is Lupranol 2090 (BASF). These polyols are tri-functional to facilitate the moderate cross reactivity.

The at least one polyol may also be included in the foam composition to preserve the modulus and the strength of the foam. The polyol may be self catalyst amino initiated polyol. The self catalyst polyol may reduce the level of catalyst and promote the gelation rate without adversely affecting the other properties. Examples of these polyols include, but not limited to, Voranol Voractive 7010 (Dow Chemicals) and Voranol Voractive 8000 (Dow Chemicals).

The at least one polyol may comprise an ethylene diamino initiated tetra-functional self catalyst polyol of molecular weight of about 3400 Da and hydroxyl number of about 60 (such as Lupranol VP9350 (BASF)).

In order to ensure the higher order of reactivity in the polyol mixture, the at least one polyol in the foam composition may comprise polyether triamines or tetraamines having molecular weight of about 3250-8000 Da and having an amine number of about 25-38. These polyols may minimize the catalyst concentration used in the foam composition. Examples of such amines include polyether triamine having a molecular weight of about 4000-6000.

In addition to these conventional polyols, polymer polyols may be used alone or blended with other polyols. Polymer polyols are well known in the art. Such compositions may be produced by polymerizing one or more ethylenically unsaturated monomer dissolved or dispersed in a polyol in the presence of a free radical catalyst to form a stable dispersion of polymer particles in the polyol. These polymer polyol compositions have the valuable property of imparting to polyurethane foams produced therefrom higher load-bearing properties than are provided by the corresponding unmodified polyols.

The monomer content may be typically selected to provide the desired solids content required for the anticipated end-use application. In general, it will usually be desirable to form the polymer polyols with as high a resulting polymer or solids contents as will provide the desired viscosity and stability properties. For typical high resilience (HR) foam formulations, solids content of up to about 45 weight percent or more are feasible and may be provided.

Any suitable isocyanate may be used for the purposes of the present invention. According to a particular aspect, the at least one isocyanate may comprise an isocyanate content of about 2.4-49%. In particular, the isocyanate content may be 5-45%, 10-40%, 17-38%, 20-30%, 25-35%. Even more in particular, the isocyanate content may be about 28-32%.

The isocyanate content may be defined as the weight percentage of reactive isocyanates (—NCO group) in an isocyanate, modified isocyanate or pre-polymer isocyanate.

According to another particular aspect, the at least one isocyanate may comprise an aromatic, aliphatic, prepolymer isocyanate, or a combination thereof. The at least one isocyanate avoids cross-linking and delayed hardening due to secondary allophanate and biuret reactions. For example, organic polyisocyanates that are useful in producing polyurethane foam may include organic compounds that contain at least two isocyanato groups and generally will be any of the known aromatic or aliphatic polyisocyanates. Such compounds are well-known in the art. Suitable organic polyisocyanates include the hydrocarbon diisocyanate (e.g. the alkylene diisocyanates and the arylene diisocyanates) such as 2,4- and 4,4'-methylene diphenyl diisocyanate (MDI) and 2,4- and 2,6-toluene diisocyanate (TDI), as well as known tri-isocyanates and polymethylene poly(phenylene isocyanates) also known as polymeric or crude MDI. In particular, the isocyanate may be toluene diisocyanate (TDI), diphenylmethane diisocyanate (MDI), or a combination thereof.

For example, for monomeric TDI, the isocyanate content is about 48.2% whereas for MDI, the isocyanate content is about 33.6%.

Non-limiting examples of other suitable polyisocyanates are 2,4-diisocyanatotoluene; 2,6-diisocyanatotoluene; methylene bis(4-cyclohexyl isocyanate); 1,8-diisocyanatooctane; 1,5-diisocyanato-2,2,4-trimethylpentane; 1,9-diisocyanatononane; 1,10-diisocyanatopropylether of 1,4-butylene glycol; 1,11-diisocyanatoundecane; 1,12-diisocyanatododecane bis(isocyanatohexyl)sulfide; 1,4-diisocyanatobenzene; 3,5-diisocyanato-o-xylene; 4,6-diisocyanato-m-xylene; 2,6-diisocyanato-p-xylene; 2,4-diisocyanato-1-chlorobenzene; 2,4-diisocyanato-1-nitrobenzene; 2,5-diisocyanato-1-nitrobenzene; 4,4'-diphenylmethylene diisocyanate; 2,4'-diphenylmethylene diisocyanate; and polymethylene poly (phenylene isocyanates) and mixtures thereof.

For flexible and semi-flexible foams, the preferred isocyanates generally are, e.g., mixtures of 2,4-toluene diisocyanate and 2,6-toluene-diisocyanate (TDI) in proportions by weight of about 80% and about 20% respectively and also about 65% and about 35% respectively; mixtures of TDI and polymeric MDI, preferably in the proportion by weight of about 80% TDI and about 20% of crude polymeric MDI to about 50% TDI and about 50% crude polymeric MDI; and all polyisocyanates of the MDI type. For rigid foams, the preferred isocyanates are, e.g., polyisocyanates of the MDI type and preferably crude polymeric MDI.

The at least one isocyanate may be added in any suitable amount. In particular, the amount of isocyanate added may be in an amount of about 20-100, 30-90, 35-85, 40-80, 50-70, 55-65 parts per hundred parts (pphp) of polyol. Even more in particular, the amount of isocyanate added may be in an amount of about 30-55 pphp of polyol.

The method may further comprise the step of adding at least one surfactant. Any suitable surfactant may be used for the purposes of the present invention. For example, the surfactant may be a silicon-based surfactant. In particular, the surfactant may comprise a molecular weight of about 5000-30000 Da.

The silicon-based surfactant may achieve cell stabilisation and uniform distribution of cells in the resultant foam. The silicon-based surfactant may be derivatives of poly(dimethylsiloxane) oil derivatives wherein the polysiloxanes are linked with terminal polyoxyalkylene blocked copolymer groups consisting of 5 to 30 carbon atoms, more particularly 10 to 15 carbon atoms, through silicon to carbon, or silicon to oxygen to carbon bonds. The respective polyoxyalkylene blocks are bonded to different silicon atoms in the polysiloxane backbone, resulting in branched molecular structures or linear molecular structures. The terminal polysiloxane block may be end capped by trialkyl siloxy group in addition to the siloxy groups by which siloxane backbone is formed. The polysiloxane block may be end capped by difunctional siloxy units of which the two remaining valences may be satisfied by bonding to organic radicals. Examples of such organic radicals include hydrocarbyl groups having 1-12 carbon atoms including alkyl, aryl, arylalkyl or halogen substituted derivatives of such groups. The polyoxyalkylene groups may be constituted of oxyethylene units, oxopropylene units or a combination thereof. These blocks may be terminated by hydroxyl groups or capped with monovalent groups such as alkyl, aryl, arylalkyl, acyl carbamyl and the like. According to a particular aspect, the silicon-based surfactant may comprise a siloxane group comprising 30-70% of the molecular structure. The silicon to carbon linked groups are not hydrolysable whereas silicon, oxygen to carbon are hydrolysable, and therefore the former group is utilised for long term effect while the latter is used for short term gain.

Examples of suitable silicon-based surfactants include "hydrolysable" polysiloxane-polyoxyalkylene block copolymers, "non-hydrolysable" polysiloxane-polyoxyalkylene block copolymers, cyanoalkylpolysiloxanes, alkylpolysiloxanes, and polydimethylsiloxane oils. Other examples of surfactants may include Tegostab 8736LF2 (Evonik), which contributes to the achieving of the mild surfactant action in the fast system, and Tegostab 4690 (Evonik), which contributes to the achieving of regular cell size distribution yielding uniform cell sizes according to the product requirement.

The type of surfactant used and the amount required depends on the type of foam produced as recognized by those skilled in the art. Silicon-based surfactants may be used as such or dissolved in solvents such as glycols. For flexible foams the reaction mixture may contain about 0.1-6 pphp, particularly 0.7-2.5 pphp of silicon-based surfactant. For flexible molded foam the reaction mixture may contain about 0.1-5 pphp, particularly 0.5-2.5 pphp of silicon-based surfactant. For rigid foams the reaction mixture may contain about 0.1-5 pphp, particularly 0.5-3.5 pphp of silicon-based surfactant. The amount of surfactant added in the preparation of the foam composition may be adjusted to achieve the required foam cell structure and foam stabilization.

According to a particular aspect, the cell size of the foam structure may be increased by reducing the surfactant concentration in the composition. According to another particular aspect, the cell size of the foam structure may be increased by reducing the strength of the surfactant. In addition, the density of the composition may be reduced by any suitable method to achieve more controlled foam-fabric interactions such as better hand feel of the composition, reduction of penetration of the foam composition into the fabric or improve fabric adhesion to the foam. An example of a method to reduce the density of the foam composition comprises pre-frothing of the foam composition comprising the polyol and isocyanate using liquid carbon dioxide.

The method may further comprise the step of adding at least one blowing agent. Any suitable blowing agent may be used for the purposes of the present invention. For example, the blowing agent may be water, hydrocarbon, halogenated hydrocarbon, or a combination thereof. In particular, the blowing agent may be water.

The at least one blowing agent may be added in any suitable amount. In particular, the amount of blowing agent added may be in an amount of about 1-15, 2-10, 3-8, 6-7 parts per hundred parts (pphp) of polyol.

Any suitable blowing agent may be used for the purposes of the present invention. For example, the blowing agent may be water and/or halogenated hydrocarbons. Examples of suitable halogenated hydrocarbons include, but are not limited to, trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane and octafluorocyclobutane. According to a particular aspect, the use of halocarbon blowing agents is avoided. In particular, the at least one blowing agent may be water.

Another class of blowing agents include thermally unstable compounds which liberate gases upon heating such as N,N'-dimethyl-N,N'-dinitrosoterephthalamide, amine formates, formic acid and the like.

The quantity of blowing agent employed may vary with factors such as the density desired in the foam. According to a particular aspect, the at least one blowing agent may be present in an amount of about 0.5-20, 1.5-5, 2.5-3 pphp of polyol.

Water may be used as a reactive blowing agent in the formation of both flexible and rigid foams. In the production of flexible slabstock foams, water may be used in concentrations of about 2-6.5 pphp of polyol, particularly 3.5-5.5 pphp. Water levels for TDI molded foams may range from about 3-4.5 pphp. For MDI molded foam, the water level may be in the range of about 2.5-5 pphp. Rigid foam water levels, for example, range from 0.5-5 pphp, particularly 0.5-1 pphp.

The method may further the step of adding any other suitable additive. According to a particular aspect, the method may comprise the step of adding crosslinkers. For example, crosslinkers may be used in the preparation of a foam composition for use in the production of polyurethane foams. Crosslinkers are typically small molecules; usually having a molecular weight of less than 350 Da, which contain active hydrogen for reaction with the isocyanate. The functionality of a crosslinker is greater than 3 and preferably between 3 and 5. The amount of crosslinker used can vary between about 0.1 pphp and about 20 pphp and the amount used is adjusted to achieve the required foam stabilization or foam hardness. Examples of crosslinkers include glycerine, diethanolamine, triethanolamine and tetrahydroxyethylethylenediamine.

According to a particular aspect, the method may comprise the step of adding a balanced catalyst. A balanced catalyst may be defined as a catalyst which contributes to the catalytic process by equally promoting the gelling reaction and the blowing reaction. A balanced catalyst may be added based on the particular reactivity requirement. In particular, the adding of the balanced catalyst may result in the balance of the two competing reactions of gelling reaction and blowing reaction being achieved which may further result in the resultant foam having homogeneous cell size distribution and the prevention of breakage in the form of blisters and cell collapse. Any suitable balanced catalyst may be used for the purposes of the present invention. For example, a balanced catalyst such as bis(dimethylamino propyl)methyl amine may be added. Other examples of a suitable balanced catalyst may include, but not limited to, Polycat 77 (Momentive).

Foams may comprise an open-celled structure. In particular, many flexible foams comprise an open-celled structure which may also provide the dimensional stability. According to a particular aspect, the method may comprise the step of adding at least one cell opening agent. Any suitable cell opening agent may be used for the purposes of the present invention. In particular, the cell opening agent may be an ethylene oxide polyol. For example, the ethylene oxide polyol may have a molecular weight of about 2000 Da. The ethylene oxide polyol may remove a majority of cell membranes during a curing phase during the formation of a foam. The purpose of the cell opening agent is to provide specific characteristics to the foam prepared from the foam composition. For example, by including a cell opening agent, the foam prepared from the foam composition may be considered to be breathable. By being breathable, a skilled person would understand that the foam would have the ability to circulate throughout the foam structure.

Any suitable amount of the cell opening agent may be added. In particular, the cell opening agent may be added in an amount 2-3 pphp of polyol. Even more in particular, the amount of the cell opening agent added may be about 2.5 pphp of polyol.

The method may further comprise the step of curing the composition for a pre-determined period of time to form a foam article. In particular, the pre-determined period of time may be ≥30 seconds. Even more in particular, the pre-determined period of time may be between 60-90 seconds.

According to a second aspect, the present invention provides a foam composition prepared by the method described above. The foam composition prepared from the method may be suitable for use in fabric laminated foam articles.

According to a third aspect, there is provided a foam composition comprising:
at least one polyol;
at least one isocyanate; and
a catalyst,
wherein the catalyst comprises a first catalyst and a second catalyst, the first catalyst being capable of accelerating a reaction between the at least one polyol and the at least one isocyanate, and the second catalyst being capable of initiating a reaction between the at least one polyol and the at least one isocyanate at a rate slower than the first catalyst.

As mentioned above, the first catalyst may be referred to as a normal catalyst and the second catalyst may be referred to as a delayed action catalyst.

The foam composition may be for use in any suitable application. For example, the foam composition may be for use in fabric laminated foam articles.

Any suitable polyol, isocyanate, normal catalyst and delayed action catalyst may be used for the purposes of the present invention. In particular, the polyol, isocyanate, normal catalyst and delayed action catalyst may be as described above.

The amounts of normal gelling catalyst and the delayed action gelling catalyst comprised in the foam composition may be balanced. By adding suitable amounts of normal gelling catalyst and delayed action gelling catalyst in the foam composition, a suitable rate of gelling reaction is achieved when the foam composition is subsequently cured without the gelling reaction proceeding too fast. If the gelling reaction is too fast, the density of the resultant foam may be higher due to the impaired blowing reaction. Consequently, the resultant foam may have decompression voids packed with air bubbles and impaired viscoelastic properties.

According to a particular aspect, the ratio of the normal gelling catalyst to the delayed action gelling catalyst may be 0.1:1 to 15:1, 0.8:1 to 12:1, 1:1 to 10:1, 2:1 to 8:1, 5:1 to 6:1. In particular, the ratio of the normal gelling catalyst to the delayed action gelling catalyst may be in the range of about 0.5:1 to 10:1.

The amounts of normal blowing catalyst and the delayed action blowing catalyst comprised in the foam composition may be balanced. By adding suitable amounts of normal blowing catalyst and delayed action blowing catalyst to the foam composition, a suitable rate of blowing or foaming reaction is achieved when the foam composition is subsequently cured without the foaming reaction proceeding too fast. If the blowing reaction is too fast, the fast generation of carbon dioxide and concomitant diffusion of the carbon dioxide to the nuclei may result in the formation of cells in a medium which is polymerised to a lesser extent to withstand expanding gas pressure. The resultant foam may collapse or may result in the coalescence of cells leading to blisters and unequal pore size. This may lead to the formation of hard spots on the resultant foam in addition to the blisters because of the accumulation of high density polymeric areas around the blisters.

According to a particular aspect, the ratio of the normal blowing catalyst to the delayed action blowing catalyst may be 0.5:1 to 15:1, 0.8:1 to 12:1, 1:1 to 10:1, 2:1 to 8:1, 5:1 to 6:1. Even more in particular, the ratio of the normal blowing catalyst to the delayed action blowing catalyst may be in the range of about 1:1 to 10:1.

The foam composition may comprise at least one surfactant. Any suitable surfactant may be used for the purposes of the present invention. In particular, the surfactant may be as described above.

The foam composition may comprise at least one blowing agent. Any suitable blowing agent may be used for the purposes of the present invention. In particular, the blowing agent may be as described above.

The foam composition may further comprise other suitable additives. Examples of suitable additives include, but are not limited to a crosslinker, a balanced catalyst and a cell opening agent. In particular, the crosslinker, balanced catalyst and cell opening agent may be as described above.

According to a fourth aspect of the present invention, there is provided a method for the manufacture of a fabric laminated foam article comprising the steps of:
  contacting a fabric with a first mould;
  providing the foam composition according to any aspect of the present invention to a second mould;
  bringing the first mould and the second mould towards and into each other at a pre-determined rate of impact to enable the fabric to contact the foam composition;
  curing the foam composition for a pre-determined period of time to form a foam article; and
  removing the foam article.

In the method of the present invention, there is no barrier between the fabric and the foam composition when the fabric contacts the foam composition. In other words, in the step in which the first mould and the second mould are brought towards and into each other, there is direct contact between the fabric and the foam composition.

The pre-determined rate of impact may be defined as the relative impact between the foam composition and the fabric.

The pre-determined rate of impact may be any suitable rate of impact. For example, the pre-determined rate of impact may be such that the impact between the foam composition and the fabric is minimal. According to a particular aspect, the pre-determined rate of impact may be about ≤3 mm/second. In particular, the pre-determined rate of impact may be about 0.1-1, 0.5-0.8, 0.6-0.75, mm/second. Even more in particular, the pre-determined rate of closure is about 1 mm/second. The time of impact between the foam composition and the fabric is controlled to correspond to the time for the gelling reaction. For example, the time may be about 5-10 seconds after the foam composition has been poured into the second mold.

The step of bringing the first mould and the second mould towards and into each other at a pre-determined rate of impact to enable the fabric to contact the foam composition may be performed by any suitable means. For example, the step may be performed by a motor. In particular, the step may be performed by a servo attachment driven by a motor allowing regulated movement using a programmable device.

The curing step may be performed for a pre-determined period of time. In particular, the curing step is carried out until the gelation and blowing reactions are complete. The pre-determined period of time may be any suitable amount of time. According to a particular aspect, the pre-determined period of time may be ≥30 seconds. In particular, the pre-determined period of time may be about 45 seconds-2 hours, 60 seconds-1 hour, 90 seconds-45 minutes, 5 minutes-30 minutes, 10 minutes-20 minutes, 15 minutes-18 minutes. Even more in particular, the pre-determined period of time may be about 60-90 seconds. The curing step may be considered to begin after the first mould and the second mould have been brought together.

According to a particular aspect, the method may comprise contacting a fabric with the second mould before the step of providing the foam composition to a second mould. Any suitable fabric may be used for the purposes of the present invention. For example, the fabric may be single layered or double layered between 40-300 gsm.

According to another particular aspect, the method may further comprise a step of heating the first mould and the second mould to a pre-determined temperature before bringing the first mould and the second mould towards and into each other. The pre-determined temperature may be any suitable temperature, depending on the foam composition used in the method. In particular, the pre-determined temperature may be about 40-80° C.

The method of the present invention is advantageous as the problem of penetration is avoided. This is achieved in view of the balance of the gelling and blowing reactions, as well as the minimal impact of the foam composition and the fabric achieved by the pre-determined rate of impact. In particular, the end of the gelling reaction is synchronised with the impact of the foam composition and the fabric. At this point, the viscosity of the foam composition would have increased so that penetration of the foam composition into the fabric does not occur. Further, the adhesive property of the foam to the fabric is maintained at its maximum. Even more in particular, the pre-determined rate of impact will minimise the impact at the contact point between the foam composition and the fabric, thereby ensuring that the foam composition and fabric interaction may continue during the blowing reaction without resulting in the penetration of the foam composition into the fabric.

According to a particular aspect, the method may further comprise a step of trimming the foam article after the removing step. In this way, it is possible to achieve the desired shape and size of the foam article after the removing step.

According to a particular aspect, the method of the present invention may be carried out in a high pressure polyurethane mixing unit. The mixing unit may comprise a variable dosage mix head.

According to a fifth aspect, there is provided an article of manufacture comprising the fabric laminated foam article manufactured by the method according to the fourth aspect of the present invention. The article of manufacture may be any suitable article of manufacture. For example, the article of manufacture may comprise, but is not limited to, a car seat, a head rest, furniture, a diving suit or protective clothing. In particular, the protective clothing may be a knee guard. The article of manufacture may also comprise a breast covering garment. In particular, the breast covering garment may be a bra, particularly a bra cup.

Having now generally described the invention, the same will be more readily understood through reference to the following examples which are provided by way of illustration, and are not intended to be limiting.

EXAMPLES

The present example exemplifies the manufacture of a two-sided laminated knee guard.

Formulation Preparation

Three separate formulations were prepared as indicated as P1, P2 and P3, respectively, in Table 1:

TABLE 1

Components of formulations P1, P2 and P3 (Units of each of the components are per 100 parts of polyol (pphp)) and conditions of preparing articles using the formulations.

|  | P1 | P2 | P3 |
|---|---|---|---|
| Polyol |  |  |  |
| Lupranol 2046 (BASF) | 20 | 50 |  |
| Lupranol 2090 (BASF) | 50 |  | 85 |
| Lupranol VP 9350 (BASF) | 20 | 30 | 5 |
| Lupranol 4800N (BASF) | 10 | 20 | 10 |
| Total Polyol | 100 | 100 | 100 |
| Catalyst |  |  |  |
| Normal gelling catalyst: Tegoamin 33 (Evonik) | 1.5 | 2.5 | 1.8 |
| Normal blowing catalyst: Tegoamin BDE (Evonik) | 0.25 | 0.27 | 0.25 |
| Delayed action gelling catalyst: Tegoamin MS40 (Evonik) | 1.82 |  | 1 |
| Delayed action blowing catalyst: Tegoamin MS50 (Evonik) | 0.78 |  | 0.78 |
| Balanced catalyst: polycat 77 (Momentive) |  | 0.8 |  |
| Other additives |  |  |  |
| Surfactant: Tegostab 8736LF2 (Evonik) | 0.2 |  | 0.4 |
| Surfactant: Tegostab B4690 (Evonik) | 0.4 | 0.8 | 0.8 |
| Polyether amine: CTA 6000 Tri amine (Clarient) | 5 |  |  |
| Cell opening agent: Ortegol 500 (Evonik) | 2.5 | 3 |  |
| Blowing agent: Water | 3.5 | 3.2 | 3.5 |
| Isocyanate |  |  |  |
| Specflex 134 polymeric MDI | 40 | 35 | 35 |
| Conditions |  |  |  |
| Polyol tank Temp (° C.) | 25 | 25 | 25 |
| Isocyanate Tank Temp (° C.) | 25 | 25 | 25 |
| Polyol mixing pressure (Bar) | 160 | 175 | 165 |
| Isocyanate mixing pressure (Bar) | 175 | 180 | 180 |
| Gel time (seconds) | 4 | 5 | 7 |
| Blowing time (seconds) | 8 | 9 | 9 |
| Curing time (seconds) | 120 | 120 | 120 |

Method of Preparing Fabric Laminated Foam Articles

The apparatus and process used for preparing the knee guard is as shown in FIGS. 1 to 7. Referring to FIGS. 1 to 4, there is provided a first male mould 4 and a second female mould 5 each comprising an inbuilt permanent magnet 6. Pre-moulded male fabric liner 1 and pre-moulded female fabric liner 2 match the first male mould 4 and the second female mould 5, respectively. Each of pre-moulded male fabric liner 1 and pre-moulded female fabric liner 2 are formed of 100% polyester interlock fabric having a weight of 200 grams per square meter (gsm). The pre-moulded male fabric liner 1 is magnetically clamped onto the first male mould 4 by a fabric clamping ring 7 (see FIG. 2). Similarly, the pre-moulded female fabric liner 2 is also magnetically clamped onto the second female mould 5 by another fabric clamping ring 7 (see FIG. 4). In particular, steel wire rings 7 having a diameter of about 3 mm are inserted into grooves embedded with permanent magnets 6.

The cavity volume of each of the first male mould 4 and the second female mould 5 is about 25 mL, in which the thickest point is about 8 mm while the thinnest point is equivalent to the thickness of the pre-moulded fabric liners 1,2, which is about 1 mm. Each of the first male mould 4 and the second female mould 5 is made of aluminium and constructed such that each mould has its own temperature regulated water circulated heating system (not shown).

The apparatus also comprises a motor which drives the first male mould 4 during the use of the apparatus.

In use, after the pre-moulded male fabric liner 1 and the pre-moulded female fabric liner 2 have been clamped onto the first male mould 4 and the second female mould 5, respectively, the first male mould 4 and the second female mould 5 are heated to a temperature of about 45° C. by circulating hot water through the heating systems of the first male mould 4 and the second female mould 5.

Once the first male mould 4 and the second female mould 5 have been heated to a suitable temperature, the second female mould 5 is kept stationary. Formulation P1 as shown in table 1 is mixed and dosed with a Hennecke MX mixhead 8 (Hennecke Microline 45 machine with a MX8 mixhead for doses 10 g to 100 g per second; and Hennecke Baseline 1400F machine with a MX8 or MX12 mixhead for doses from 150 g to 2000 g per second) and poured into the second female mould 5 (see FIG. 5). The mixhead 8 comprises an isocyanate and polyol mixing tank. The pressure of the mixhead 8 is as shown in Table 1. The mixing time in the mixhead 8 is about 0.5 seconds and the polyol and isocyanate tank temperatures are maintained at about 25° C.

Figure 6:
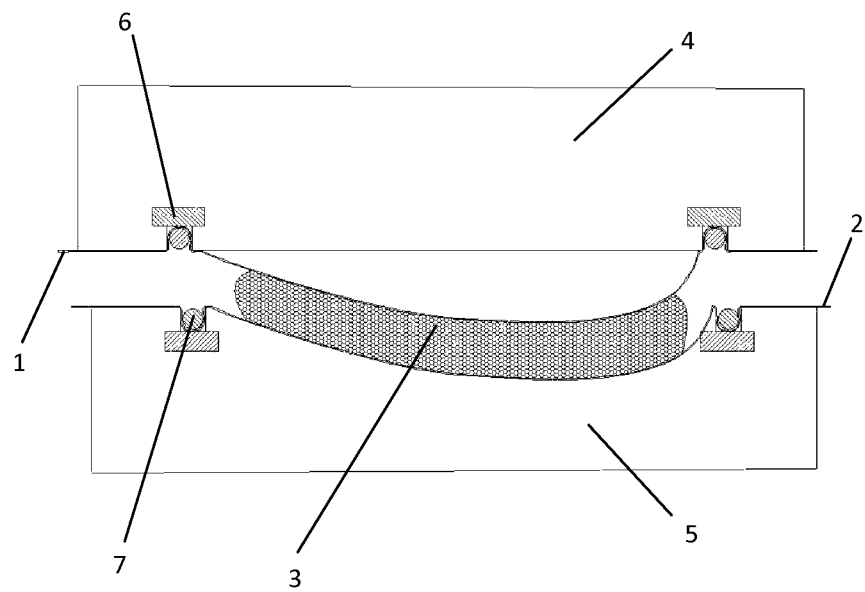
FIG. 6: A sectional side orthographic view showing the semi-closed position of the male and female moulds.
Figure 7:
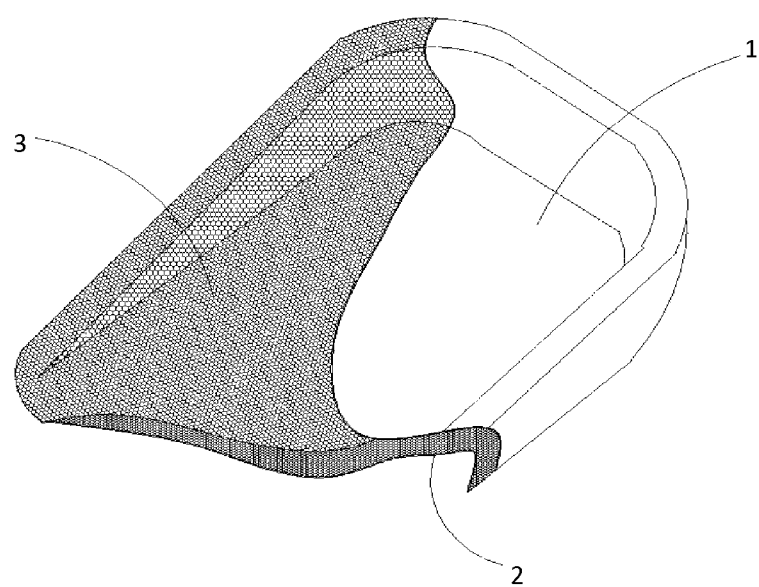
FIG. 7: A cross-sectional view of a knee guard made from the method according to one aspect of the present invention.

Immediately after pouring the formulation into the second female mould 5, the first male mould 4 is lowered at a rate of 100 mm/second until the distance between the first male mould 4 and the second female mould 5 is about 25 mm. A Festo servo unit (MTR-AC-5S-3s-AB) (not shown) capable of operational speeds of between 0.01 to 100 mm/second was used to control the rate of impact. During this time, the foam 3 is allowed to rise freely through the gap between the first male mould 4 and the second female mould 5 as illustrated in FIG. 6. The first male mould 4 is kept at this position for about 8 seconds and then further lowered towards the second female mould 5 at a rate of about 0.8 mm/second until the first male mould 4 and the second female mould have been fully brought towards each other. The formulation is left to cure for about 90 seconds before de-moulding the finished product. The excess material in the mould parting line is manually trimmed by cutting away the excess material using scissors.

The process was repeated using formulations P2 and P3 to obtain further finished products.

The penetration for each of the finished products formed from the three formulations P1, P2 and P3 were examined under UV light at 254 nm by the absence/presence of UV florescence, The lamination quality is measured against standard AATCC 124/143. The results are shown in Table 2.

TABLE 2

Properties of articles formed from formulations P1, P2 and P3.

| Properties | P1 | P2 | P3 |
|---|---|---|---|
| Density (Kg/m3) | 26 | 32 | 32 |
| Hardness (Asker F) | 5.5 | 5.8 | 6 |
| Breathability | Good | Poor | Fair |
| Even cell distribution | Good | Fair | Good |
| Penetration | No | Yes | No |

As shown in Table 1, formulation P1 contained polyether amine CTA6000 Tri amine in an amount of 5 pphp. Accordingly, it can be seen that a faster gelling time was achieved when formulation P1 was used as formulation P1 contained a moderate amount of gelling catalyst (1.5 pphp Tegoamin 33). Formulation P1 also contained delayed action gelling catalysts such as Tegoamin MS40 and Tegoamin MS50 which contributed to the reduction or elimination of penetration of the foam on the fabric.

The amount of blowing agent used, i.e. water, has an impact on the density of the final foam formed due to the impaired blowing reaction which also leads to an incomplete filling of the mould cavity. The foams prepared from formulations P2 and P3 resulted in increased density. In particular, when formulation P2 was used, complete filling of the mould cavity was not achieved. This is because formulation P2 did not contain any delayed action catalysts compared to formulations P1 and P3.

Further, in formulation P2, as only one surfactant was used (i.e. Tegostab B4690) in high concentration, sufficient stabilisation was not achieved during the gelling and curing phases leading to impaired breathability and uneven cell distribution in the resultant foam formed from the formulation. It is therefore evident that the use of a cell opening agent alone is not sufficient to achieve breathable foam.

The invention claimed is:

1. A method for preparing a foam composition for use in fabric laminated foam articles comprising the steps of:
   adding at least one polyol;
   adding at least one isocyanate; and
   adding a catalyst composition,
wherein the catalyst composition comprises a first catalyst composition and a second catalyst composition, the first catalyst composition being capable of accelerating a reaction between the at least one polyol and the at least one isocyanate, and the second catalyst composition being capable of initiating a reaction between the at least one polyol and the at least one isocyanate at a rate slower than the first catalyst composition, wherein the first catalyst composition comprises a first gelling catalyst and a first blowing catalyst and the second catalyst composition comprises a delayed action gelling catalyst and a delayed action blowing catalyst, and wherein the weight ratio of the first gelling catalyst to the delayed action gelling catalyst is in the range 0.1:1 to 15:1, the weight ratio of the first blowing catalyst to the delayed action blowing catalyst is in the range 0.5:1 to 15:1, the weight ratio of the first gelling catalyst to the first blowing catalyst is in the range 2:1 to 25:1, and the weight ratio of the delayed action gelling catalyst to the delayed action blowing catalyst is in the range 0.2:1 to 5:1;
with the proviso that the first gelling catalyst is not a delayed action gelling catalyst and the first blowing catalyst is not a delayed action blowing catalyst.

2. The method according to claim 1, wherein the second catalyst composition is an organic delayed action catalyst composition.

3. The method according to claim 1, wherein the first gelling catalyst is selected from the group consisting of: 1,4-diazabicyclo[2.2.2]octane, N-(3-dimethylaminopropyl)-N,N-diisopropanolamine, dibutyl tin dilaurate and stannous octoate.

4. The method according to claim 3, wherein the delayed action gelling catalyst is formed by reacting the amino group of a gelling catalyst selected from the group consisting of 1,4-diazabicyclo[2.2.2]octane and N-(3-dimethylaminopropyl)-N,N-diisopropanolamine with an acid selected from the group consisting of: 2-hydroxypropionic acid, formic acid and lactic acid, and/or wherein the delayed action blowing catalyst is formed by reacting the amino group of a blowing catalyst with an acid selected from the group consisting of: 2-hydroxypropionic acid, formic acid and lactic acid.

5. The method according to claim 1, wherein the at least one polyol comprises a difunctional polyol, a tri-functional polyol, a tetra-functional polyol or a combination thereof.

6. The method according to claim 1, wherein the at least one isocyanate comprises an isocyanate content of about 2.4-49%, and/or wherein the delayed action blowing catalyst is formed by reacting the amino group of a blowing catalyst with an acid selected from the group consisting of: 2-hydroxypropionic acid, formic acid and lactic acid.

7. The method according to claim 1, further comprising the step of adding at least one surfactant.

8. The method according to claim 1, further comprising the step of adding at least one blowing agent.

9. The method according to claim 1, further comprising the step of curing the composition for a pre-determined amount of time to form a foam article.

10. A foam composition for use in fabric laminated foam articles comprising:
   at least one polyol;
   at least one isocyanate; and
   a catalyst composition,
wherein the catalyst composition comprises a first catalyst composition and a second catalyst composition, the first catalyst composition being capable of accelerating a reaction between the at least one polyol and the at least one isocyanate, and the second catalyst composition being capable of initiating a reaction between the at least one polyol and the at least one isocyanate at a rate slower than the first catalyst composition, wherein the first catalyst composition comprises a first gelling catalyst and a first blowing catalyst and the second catalyst composition comprises a delayed action gelling catalyst and a delayed action blowing catalyst, and wherein the weight ratio of the first gelling catalyst to the delayed action gelling catalyst is in the range 0.1:1 to 15:1, the weight ratio of the first blowing catalyst to the delayed action blowing catalyst is in the range 0.5:1 to 15:1, the weight ratio of the first gelling catalyst to the first blowing catalyst is in the range 2:1 to 25:1, and the weight ratio of the delayed action gelling catalyst to the delayed action blowing catalyst is in the range 0.2:1 to 5:1;
with the proviso that the first gelling catalyst is not a delayed action gelling catalyst and the first blowing catalyst is not a delayed action blowing catalyst.

11. The foam composition according to claim 10, wherein the second catalyst composition is an organic delayed action catalyst composition.

12. The foam composition according to claim 10, wherein the first gelling catalyst is selected from the group consisting of: 1,4-diazabicyclo[2.2.2]octane, N-(3-dimethylaminopropyl)-N,N-diisopropanolamine, dibutyl tin dilaurate and stannous octoate.

13. The foam composition according to claim 10, wherein the delayed action gelling catalyst is formed by reaction of a gelling catalyst with an acid selected from the group consisting of: 2-hydroxypropionic acid, formic acid and lactic acid, and/or wherein the delayed action blowing catalyst is formed by reaction of the amino group of a blowing catalyst with an acid selected from the group consisting of: 2-hydroxypropionic acid, formic acid and lactic acid.

14. The foam composition according to claim 10, wherein the at least one polyol comprises a difunctional polyol, a tri-functional polyol, a tetra-functional polyol or a combination thereof.

15. The foam composition according to claim 10, wherein the at least one isocyanate comprises an isocyanate content of about 2.4-49%.

16. The foam composition according to claim 10, further comprising at least one surfactant.

17. The foam composition according to claim 10, further comprising at least one blowing agent.

18. A method for the manufacture of a fabric laminated foam article comprising the steps of:
   contacting a fabric with a first mould;
   providing the foam composition according to claim 10 to a second mould;
   bringing the first mould and the second mould towards and into each other at a pre-determined rate of impact to enable the fabric to contact the foam composition;
   curing the foam composition for a pre-determined period of time to form a foam article; and
   removing the foam article.

19. The method according to claim 18, further comprising a step of trimming the foam article after the removing step.

20. An article of manufacture comprising a fabric laminated foam article manufactured by the method according to claim 18.

21. The method according to claim 1, wherein the first blowing catalyst is selected from the group consisting of bis(2-dimethylaminoethyl)ether, N,N-dimethylethanolamine, and N,N,N'-trimethyl-N'-hydroxyethyl-bisaminoethylether.

22. The foam composition according to claim 10, wherein the first blowing catalyst is selected from the group consisting of bis(2-dimethylaminoethyl)ether, N,N-dimethylethanolamine, and N,N,N'-trimethyl-N'-hydroxyethyl-bisaminoethylether.

* * * * *